(No Model.) 3 Sheets—Sheet 1.

L. D. WOODWORTH.
MOLD FOR GLASS TILES FOR FLOORS, &c.

No. 286,984. Patented Oct. 16, 1883.

Witnesses:
D. F. Keleher.
Eugene Smett.

Inventor:
L. D. Woodworth,
By J. C. Brecht,
Attorney.

(No Model.) 3 Sheets—Sheet 2.
L. D. WOODWORTH.
MOLD FOR GLASS TILES FOR FLOORS, &c.
No. 286,984. Patented Oct. 16, 1883.
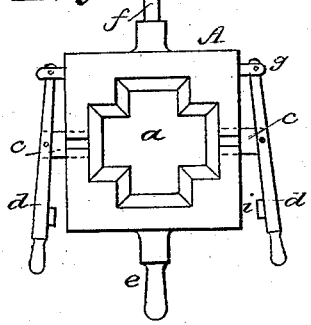
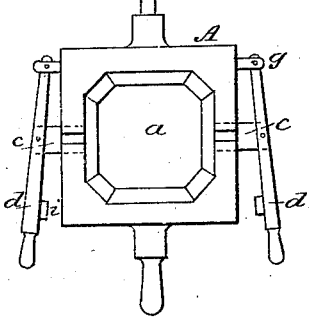
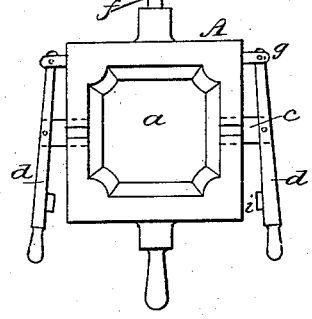
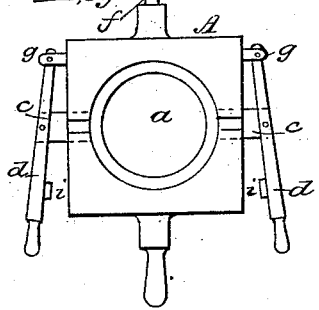
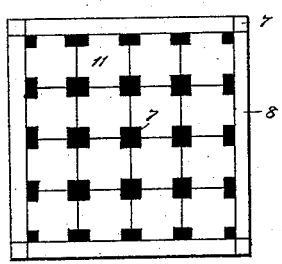
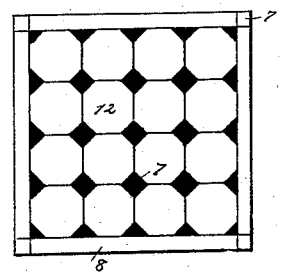
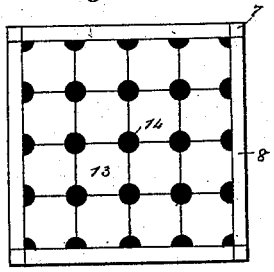
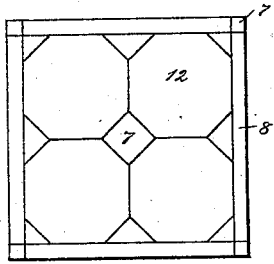
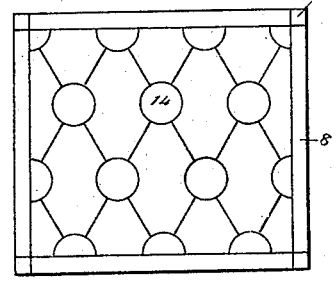
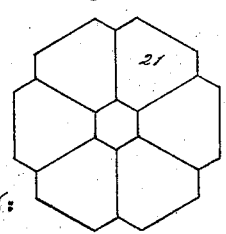
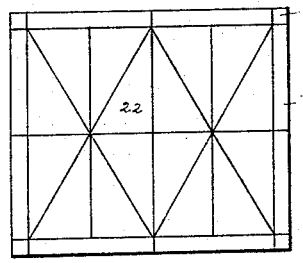
Witnesses:
D. F. Keleher
Eugene Smelt
Inventor:
L. D. Woodworth,
By T. C. Brecht,
Attorney.

(No Model.) 3 Sheets—Sheet 3.
L. D. WOODWORTH.
MOLD FOR GLASS TILES FOR FLOORS, &c.
No. 286,984. Patented Oct. 16, 1883.
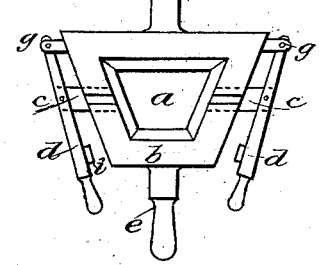
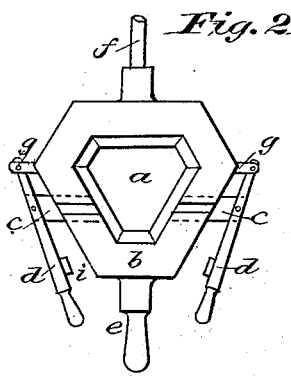
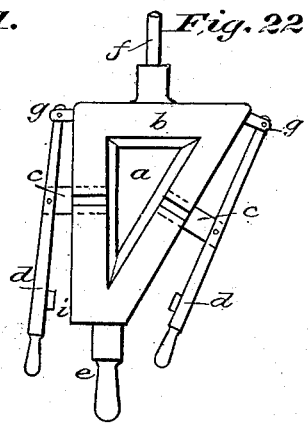
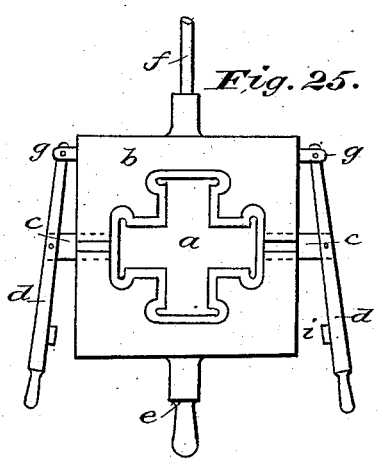
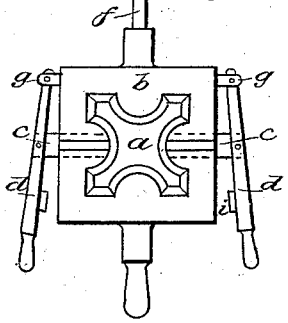
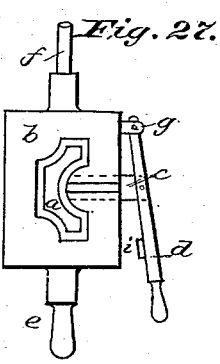
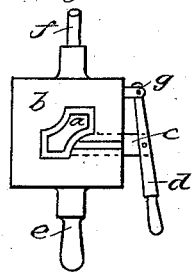
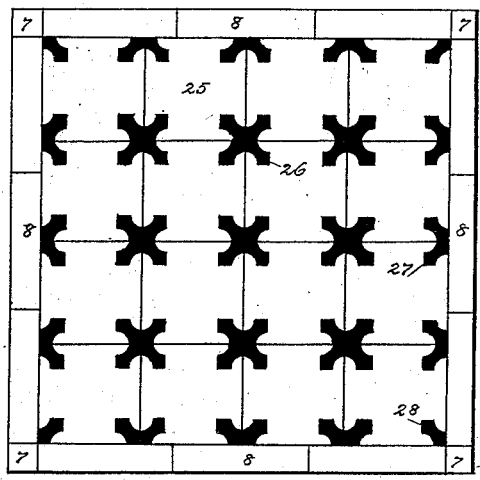
Witnesses:
L. F. Keleher
Eugene Smett
Inventor:
L. D. Woodworth
By T. C. Brecht
Attorney.

UNITED STATES PATENT OFFICE.

LAURIN D. WOODWORTH, OF YOUNGSTOWN, OHIO.

MOLD FOR GLASS TILES FOR FLOORS, &c.

SPECIFICATION forming part of Letters Patent No. 286,984, dated October 16, 1883.

Application filed March 24, 1883. (No model.)

*To all whom it may concern:*

Be it known that I, LAURIN D. WOODWORTH, a citizen of the United States, residing at Youngstown, in the county of Mahoning and State of Ohio, have invented certain new and useful Improvements in Molds for Glass Tiles for Floors, &c.; and I do hereby declare the following to be a full, clear, and exact description of the invention, such as will enable others skilled in the art to which it appertains to make and use the same.

My invention relates to improvements in molds for the manufacture of tiles made of glass for floors, hearths, mantel-facings, and other uses; and the object of my invention is to produce molds for manufacturing tiles of glass of any design or ornamentation, and such tiles to interlock with each other and the cement in which they are laid or held in place. Said tiles can be beautified and ornamented with any design upon either surface, or both, by impressions from the mold or plunger, or by painting, or any other manner of ornamentation known.

The invention consists in the construction and arrangement of molds, rings, and plungers, by which glass tiles can be made of any suitable or desired design or configuration for floors, hearths, mantel-facings, other interior fittings, or any other purposes; and it also consists in such glass tiles as a new article of manufacture, all of which will be more fully described hereinafter, and specifically pointed out in the claims, reference being had to the accompanying drawings and the letters of reference marked thereon.

Figure 1:
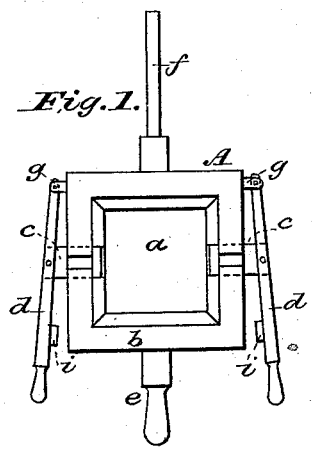
Figure 2:
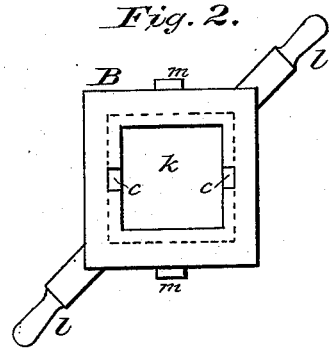
Figure 3:
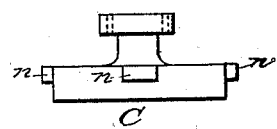
Figure 4:
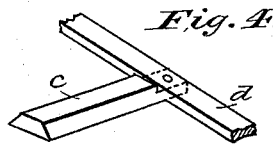
Figure 5:
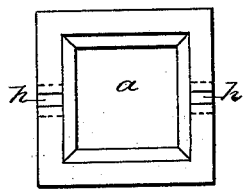
Figures 6, 8:
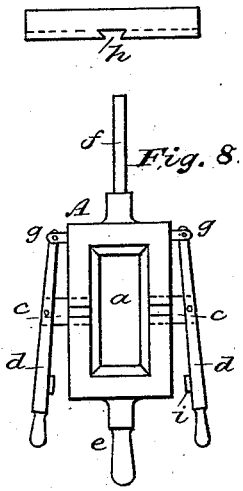
Figure 7:
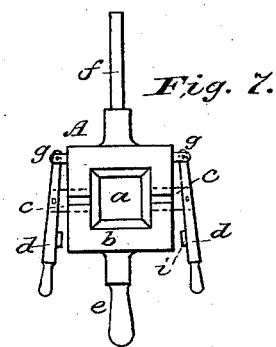
Figure 9:
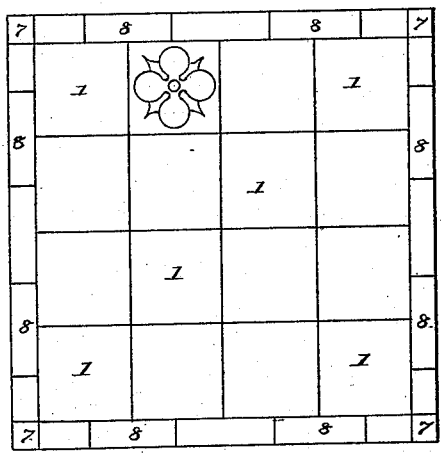
Figure 10:
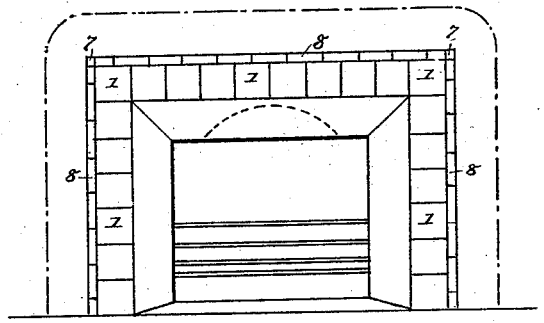

In said drawings, Figure 1 represents a face view of one of my improved molds. Fig. 2 is the ring for the same. Fig. 3 is a side view of the plunger for the same. Fig. 4 is a detached perspective view of the pin attached to the lever for forming the groove in the tiles. Fig. 5 is a bottom view of a tile made in the above mold. Fig. 6 is a side view of the same. Figs. 7 and 8 are modifications of said mold, ring, and plunger, and the tile produced is intended for borders. Fig. 9 represents a section of a floor or hearth. Fig. 10 shows a mantel-facing. Fig. 11 represents a face view of a mold for a notched tile. Fig. 12 is a similar view of a mold for tiles with the corners cut off by a right line. Fig. 13 is a like view of a mold for tiles with the corners indented by the segment of a circle. Fig. 14 is a view of a mold for circular tiles. Figs. 15, 16, 17, 18, and 19 represent sections of a floor or hearth embracing tiles made in molds shown in Figs. 11, 12, 13, and 14. Figs. 20, 21, 22, 25, 26, 27, and 28 are modifications of molds for different-shaped tiles. Figs. 23, 24, and 29 represent sections of a floor or hearth composed of tiles made in the preceding molds.

In all of the figures of the drawings similar letters refer to like parts.

In the drawings, the mold or base A is provided with the matrix $a$, the ring-seat $b$, the pins $c$, attached to lever $d$, and the handles $e$, and tail-guide $f$. The levers $d$ are pivoted at one side of the mold, as shown at $g$, and about midway of the mold the levers are pivoted to said mold by the pins $c$, so that when the outer ends of the levers are moved inward the pins $c$, which are preferably of dovetail cross-section, form the groove $h$, largest at the bottom, directly across the flange of the tile, by which the tiles are held in place by the cement on which they are laid. Suitable stops, $i$, are secured to the levers $d$, which govern their movement. The ring B is formed to fit the mold, and rests upon it. It is provided with the opening $k$, the dotted lines representing the shape of the matrix when the ring is in place, and the space between them and the edges representing the thickness of flanges that will appear upon the product. It has the handles $l$ preferably on the corners, and the lugs $m$, which extend outward and downward, upon the outer edges of the ring, to guide and hold the ring in place. The plunger C is provided with lugs $n$, which limit its descent through the ring B, and head $o$ serves to attach it to the press, in the ordinary manner. In Fig. 4 is represented a perspective view, on an enlarged scale, of the pin $c$ for forming the dovetail recesses in the tiles, by which they are held in place in the cement. These pins are pivoted to the levers $d$, so as to readily accommodate themselves to the movement of the levers when they are forced in or drawn out from the molds. The walls of the matrices are as near perpendicular as will allow delivery, and are uniform in depth. The ring-seat of the mold and the impinging part of the ring are preferably fitted together, and the plunger is fitted into the opening of the ring, with the lugs adjusted so as to permit the face of the plunger to descend as far below the ring as is desired for the depth of the flange. The pins must fit perfectly into their seats, so that there is no lost motion, and they can be varied in shape and size, as preferred, the essential feature being that they are smallest at the surface of the ring-seat. The inner edges of the ring B extend over the walls of the matrix as far as desired for the thickness of the flange, which is preferably made about one-fourth of an inch, and the pins $c$ are projected into the cavity of the mold precisely the distance of this extension. The molds, rings, plungers, and pins with attachments are made of iron or other metal, as glass molds for press-ware are usually made, and of suitable thickness at all points to maintain a proper temperature in working.

I have shown a variety of different-shaped molds, in which the matrices form various sizes and configurations of tiles; but in all of these molds the mold or base, the ring, the plunger, the pins, and levers are similar to those described in the first figures, and they will need no further description here.

In the remaining figures I have represented sections of hearths or floors embracing the different shapes of glass tiles made in the molds above described, and they will require no further elucidation here. If transparent glass is used, and it is desired for beauty or protection that the tile be embellished upon the under side, the design is engraved or cut upon the plunger; or the ornamentation may be applied to the tile by painting or other decorative art. If the ornamentation is to be upon the upper side of the tile, as must be the case for opaque glasses, the design must be engraved or cut upon or in the bottom of the matrix; or the tiles may be ornamented by art after they have left the oven or leer.

Excepting in the case where the ornamentation is on the under side of the tile, it is preferable to etch the upper surface, either by a sand-blast or the use of floric acid, so as to remove the polish and add beauty to the tiles.

Any kind of glass may be used with good results, as the tiles so lay together when in place that breakage by atmospheric action will not occur; but I prefer, especially in hearths and mantle-facings, to use the best of lead-glass.

Ornamented in any manner in any of the popular designs, made of the various-colored glasses, and tastefully laid, a floor, hearth, or mantel-facing made of the tiles exceeds all clay or encaustic tiles both in beauty and durability, and can be made at much less expense, the soft cement in which they are laid, embedded between the flanges and within the spaces formed by the pins, holds each firmly in place, so that no frame-work is required. The pins may be of ogee, curved, or other form in cross-section, but largest at the bottom.

The operation is as follows: The plunger is attached by means of its neck to any ordinary glass-press having its power downward. The mold is placed underneath and adjusted to its position by means of guides. The ring is then put in place upon the ring-seat of the mold, the pins $c\ c$ are pressed inward by the levers, and the gather of melted glass is dropped from a pontil into the cavity of the mold. The plunger is then caused to descend by means of a lever upon the press into the ring, spreading the glass throughout the matrix. The plunger is then raised, the pins drawn outward, and the product emptied from the mold and taken to the leer or oven for annealing.

Having thus described my invention, what I claim is—

1. Molds for pressing glass tiles, provided with one or more grooves or slots across the ring-seat for a pin-bed, which is smallest at the surface of the ring-seat, substantially as and for the purpose specified.

2. In molds for manufacturing glass tiles, the pin $c$, with its attachment for operating it, for forming a groove or slot in the flange of the tile, substantially as and for the purpose set forth.

3. A mold for manufacturing glass tiles, having a matrix of desired configuration, in combination with a ring, plunger, and one or more pins, as shown, so as to produce on the under side of the tile a downwardly-projecting flange around its edges bisected in one or more places by a groove, constructed as shown.

4. Molds for the manufacture of glass tiles, consisting of a base provided with a matrix having the configuration desired, a ring and plunger corresponding therewith, and pins to form grooves across the flanges of the tiles, substantially as and for the purposes specified.

5. The mold for manufacturing glass tiles, as described, consisting of a base, A, having a matrix, $a$, of any configuration desired, a corresponding ring, B, and plunger C, the pins $c$, and levers $d$, all arranged for operation substantially as specified.

6. A mold made solid or sectional for the manufacture of glass tiles, consisting of a base, A, having a matrix, $a$, of any shape desired, in combination with a ring, B, and plunger C, the pins $c$, of dovetail or equivalent cross-section, and operated by levers $d$, substantially as specified.

7. Glass tiles for floors, hearths, mantels, or other uses having an annular downward-projecting flange bisected in one or more places by a groove largest at the bottom, substantially as and for the purpose set forth.

8. Glass tiles for floors, hearths, mantels, and other uses laid in plain or ornamental manner to form any desired design, and secured in place by the cement upon which they are laid, substantially as and for the purpose specified.

9. A floor, hearth, mantel, &c., composed of a series of interlocking plain or ornamental glass tiles provided with flanges bisected by one or more grooves largest at the bottom for securing them in place on the cement, substantially as specified.

10. As a new article of manufacture, glass tiles for floors, hearths, mantels, &c., plain or ornamental, and provided with an annular flange bisected in one or more places by a groove largest at the bottom, substantially as and for the purpose set forth.

In testimony whereof I affix my signature in presence of two witnesses.

LAURIN D. WOODWORTH.

Witnesses:
O. E. KNIGHT,
EUGENE SMITH.